United States Patent

Righi

[15] 3,692,257

[45] Sept. 19, 1972

[54] AUTOMATIC TAPE RECORDING-REPRODUCING APPARATUS

[72] Inventor: Nardino Righi, Via Maniago 2, Milan, Italy

[22] Filed: May 24, 1971

[21] Appl. No.: 146,172

[52] U.S. Cl. ....................................242/198, 274/4 F

[51] Int. Cl......G03b 1/04, G11b 15/32, G11b 23/04

[58] Field of Search..............................242/197–200; 274/4 C, 4 F, 11 C

[56] References Cited

UNITED STATES PATENTS

| | | | |
|---|---|---|---|
| 3,495,835 | 2/1970 | Laa | 274/4 F |
| 3,603,595 | 9/1971 | Wada | 274/4 E |
| 3,620,479 | 11/1971 | Umeda | 242/198 |
| 3,628,754 | 12/1971 | Fujikawa | 242/198 |

*Primary Examiner*—Leonard D. Christian
*Attorney*—Walter Becker

[57] ABSTRACT

An automatic type of "cassette" recording-reproducing apparatus, comprising a support plate to which a cartridge carrying frame is pivoted and movable between upper and lower positions for engaging a pair of drawing spindles with the corresponding tape take-up reel, wherein the drawing spindle more closely spaced from the pivoting of said frame is made axially movable and cam means are provided which are effective to raise and lower said spindle as a cartridge is inserted and removed, respectively, so as to minimize the height dimension of the recording-reproducing apparatus.

4 Claims, 6 Drawing Figures

Inventor:

Nardino Righi

By [signature]

Inventor:
Nardino Righi
By [signature]

AUTOMATIC TAPE RECORDING-REPRODUCING APPARATUS

This invention relates to tape recording-reproducing apparatus of the automatically operated type by introducing a cartridge which has been suitable preset and incorporating the magnetic tape take-up reels.

As well known, those reproducing or recording-reproducing devices, commonly referred to as "cassette" type devices, wherein operation automatically occurs by introducing interchangeable cartridges, are gaining an increasingly wide use.

There is the need in recording-reproducing devices to reduce the overall sizes for enabling such devices to be readily incorporated in a limited space.

The recording-reproducing devices at present known are not satisfactory in meeting such requirements.

Therefore, the object of the present invention is to provide an automatic tape recording-reproducing apparatus, wherein the cartridge is inserted in a direction parallel with the recording and/or reproducing heads, in which one of the tape drawing shafts has been made movable in an axial direction by engaging and disengaging a cartridge, and this in order to minimize the overall sizes.

Another object of the present invention is to provide a recording-reproducing apparatus of the above character, wherein by suitably proportioning and shaping the mechanism operated by a cartridge insertion, a minimum strain is required for operating the mechanism.

According to the invention, a tape recording-reproducing apparatus of the automatically operated type by inserting an insertable cartridge in a cartridge carrying frame said frame being pivoted at its cartridge inlet end according to an axis at right angles to the inserting direction and being angularly movable to move such a cartridge from a release position from first and second tape drawing spindles, to a position where it engages said spindles, one of the spindles being more closely spaced from the axis of rotation for said cartridge carrying frame, is characterized in that at least the spindle more closely spaced from the pivoting axis of said frame is axially movable between an upper cartridge engaging position and a lower or cartridge release position, cam means being provided and controlled by the automatic operation mechanism for the recording-reproducing apparatus to bring the movable spindle between its positions mentioned above in order to maintain at a minimum the angle of inclination for said cartridge carrying, frame and thus a minimum overall size in height for said recording-reproducing apparatus.

For a more complete understanding of the features for the automatic recording-reproducing apparatus according to the invention, reference will now be had to the appended drawings, in which.

Figure 1:
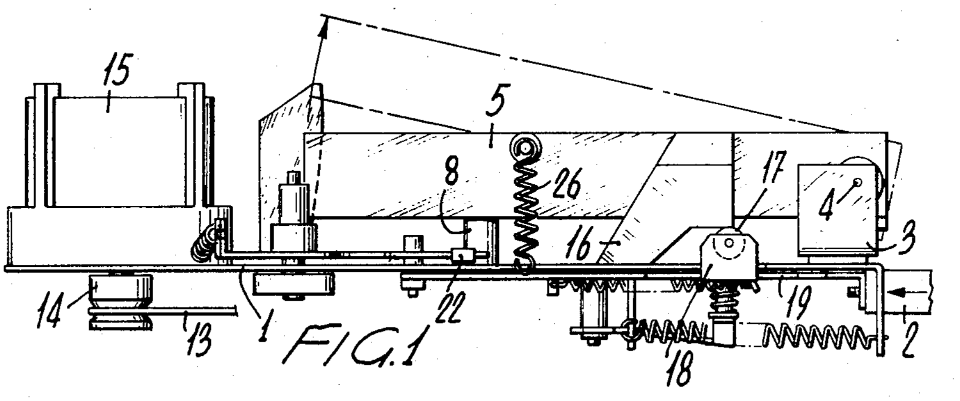
FIG. 1 is a side view showing only the mechanical parts of a recording-reproducing apparatus according to he invention at the inserted cartridge condition.

Referring to the drawings, wherein the electric section of the recording-reproducing apparatus has been omitted for the sake of a more clear explanation and because of not being a part of the present invention, it will be seen that the mechanical section of the recording-reproducing apparatus substantially comprises a support plate 1 for the several mechanical members, in front of which the operating push buttons of the recording-reproducing apparatus are located. At the top of plate 1 and at said push buttons a cross piece 3 is secured and has its ends upward facing, to these ends it being pivoted at 4 the end of a frame 5 for supporting and guiding a known type of cartridge 5 (FIG. 2) containing a magnetic recording-reproducing tape. Thus, the frame 5 can be rotated about fulcrum 4, between a slanted upper position shown in FIG. 2 and by dashed lines in FIG. 1 and lowered bottom position parallel with plate 1, shown by full lines in FIG. 1, at which the tape take-up reels (not shown) of cartridge 6 engage a first tape drawing spindle 7 and a second tape drawing spindle 8, respectively, the latter spindle being located farther than the former from the pivoting axis 4 of frame 5, as clearly shown in FIGS. 2 and 3.

Normally, the spindle 8 is rotated in the direction to feed the magnetic tape to the cartridge 6, such as in the reproducing or recording direction, whereas the spindle 8 is normally rotated in an opposite direction to the former to take up said tape again. The rotational movement of the spindles 7 and 8 is provided by any per se known means, such as by a friction pin 9 which is kept contacting a disc 10 fast with said spindle 8, and by a rotation reverse wheel system 11 which, through a suitable mechanical device operated by a proper push button (not shown), is caused to adhere against a disc 12 which can engage and release said spindle 7 axially movable as it will be specified later below. The rotational movement to said friction pin 9 and reverse wheel system 11 is provided by a suitable belt 13 winding up on pulleys connected to pin 9 and reverse wheel system 11 above referred to (these pulleys are not shown for simplicity of illustration) and concurrently on a pulley 14 carried by the shaft of the electric motor 15 for the recording-reproducing apparatus. The tape movement reverse mechanism is not described in detail, since not being a part of the present invention.

Figure 2:
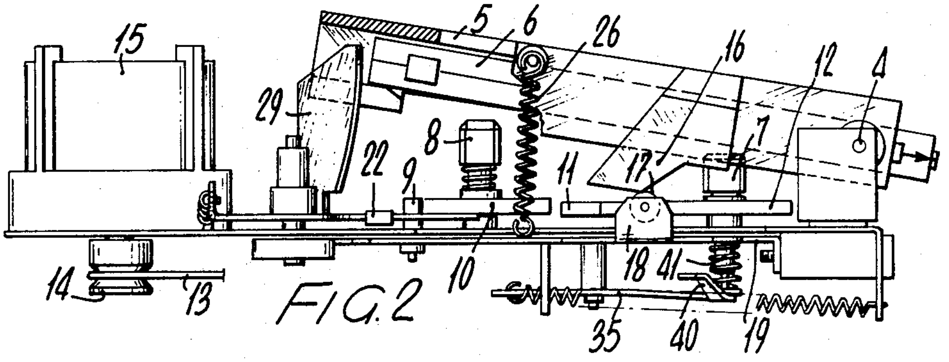
FIG. 2 is a view similar to FIG. 1, but showing the cartridge at a raised condition.
Figure 5:
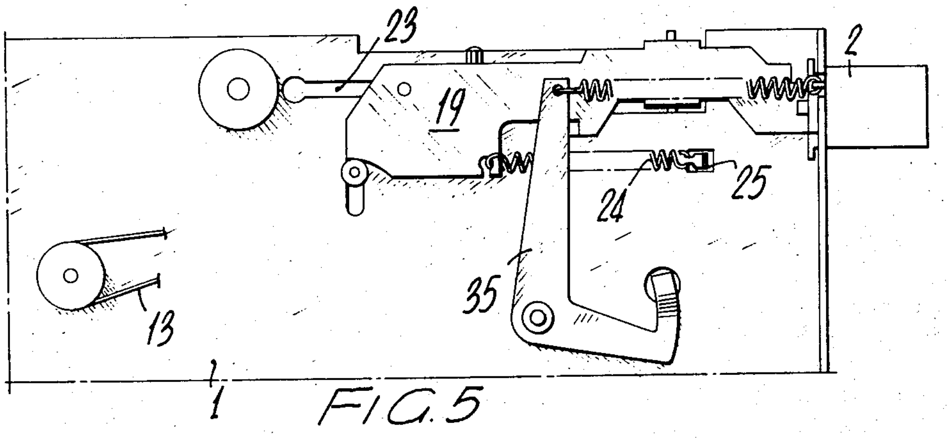
FIG. 5 is a fragmentary bottom plan view of FIG. 1.
Figure 6:
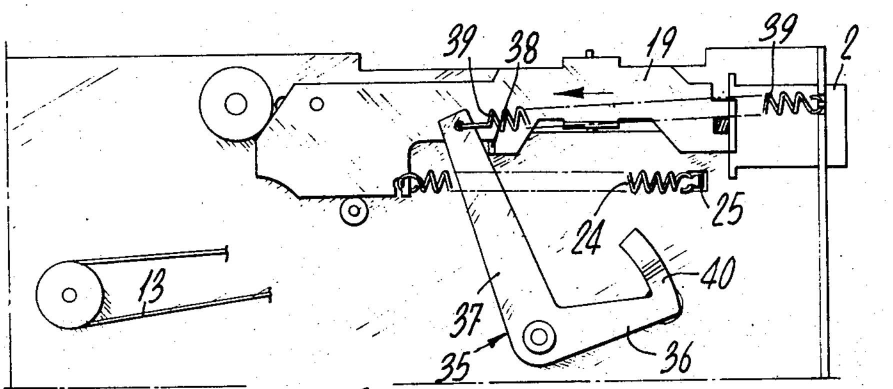
FIG. 6 is a fragmentary bottom plan view of FIG. 2.

As it will be seen in FIGS. 1 and 2, the frame 5 for supporting and guiding the cartridge 6 is provided with a side cam projection 16 which in order to present a section parallel with frame 5 and a second section rearwardly slanted bears with its shaped edge against a cam follower roller 17 pivoted to two upward facing arms 18 and 20 of a slider 19 (FIGS. 1, 2, 5 and 6) underlying plate 1 and driven by a proper push button 2. The slider 19 is supported and guided by said cam follower roller 17 pivoted to the slider arms 18 and 20, as mentioned hereinbefore, the arm 18 of which is external to plate 1, whereas the arm 20 is slidable in a longitudinal slot 21 in said plate 1. At the same time, the slider 19 is supported and guided by a spoke 22 at the end opposite to the end of push button 2, this spoke 22, provided at the top with a protruding head, sliding in a proper slot 23 (FIG. 5) longitudinally of said plate 1. A spring 24 (FIGS. 5 and 6), being hooked at one end to slide 19 and at its other end to a projection 25 on plate 1, is for returning the slide 19 to its starting position shown in FIG. 5. Similarly for the downward return movement of frame 5, a spring 26 (FIGS. 1 and 2) has been provided, by one end this spring engaging a side projection of plate 1 and by its other end engaging a projection of plate 5.

Figure 3:
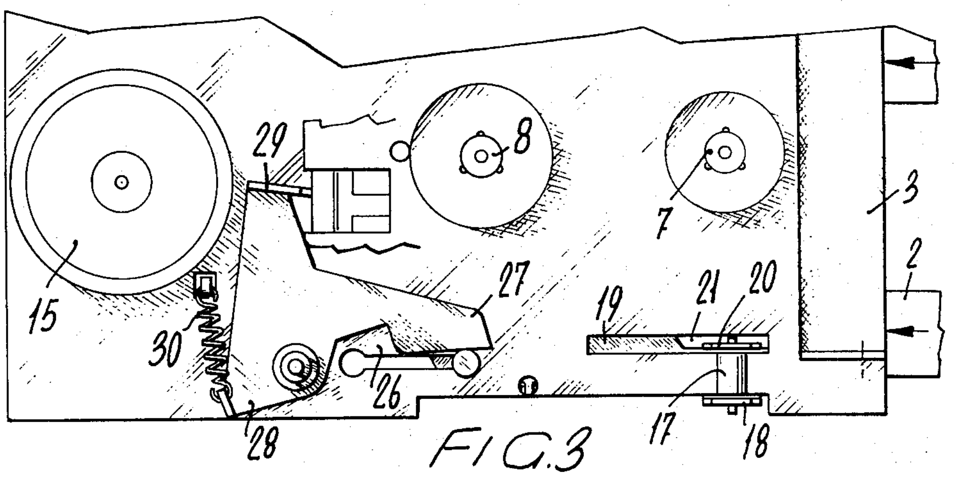
FIG. 3 is a fragmentary top plan view of FIG. 1.
Figure 4:
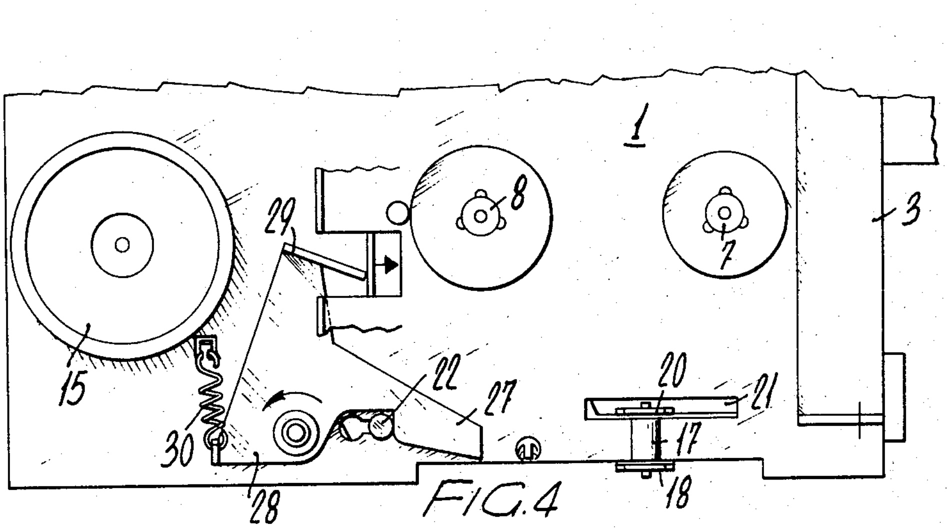
FIG. 4 is a fragmentary top plan view of FIG. 2.

The spoke 22 of slider 19 is adapted to engage and disengage in a seat 26 formed on an arm 27 of a two-armed lever 28 (FIGS. 3 and 4), this arm 27 being arranged parallel with plate 1, and the other arm 28 is L-bent and has a bent end portion 29, the end edge of the inserted cartridge 6 upward impinging thereon, as it will be seen from FIG. 2, for rotating said two-armed lever in the direction of disengaging said slider spoke 22 (anticlockwise in FIG. 4) and allowing the insertion of spindles 7 and 8 in cartridge 6, as it will be explained later below, A spring 30, connected between the two-armed lever 27, 28 and plate 1, enables the lever to return to its position shown in FIG. 4, where it engages said spoke 22. The proportioning for the arms of lever 27, 28 and calibration for the return springs are such that upon inserting a cartridge 6, the slightest pressure on the latter will suffice to cause the mechanism to be triggered.

As above stated, the spindle 7 can be moved along its axis from a release lower position to an upper position for engaging the corresponding reel within the cartridge 6 and at the same time for engaging the disc 12 to enable the latter to be rotably driven during the magnetic tape winding up operation.

This axial movement of spindle 7 is permitted by the camming of a two-armed lever 35 pivoted beneath said plate 1, acting by its suitably shaped arm 37 against the lower end of spindle 7 to raise or lower the latter. More particularly, the two-armed lever 35 has an arm 37 thereof engaging a lower projection 38 of slide 19 when the latter is forwardly urged (that is, in the direction of the arrow shown in FIG. 6) for removing a cartridge, this arm 37 being subjected to the action of a return spring 39 connected at one end to said arm 37 and at its other end to said plate 1. On the other hand, the second arm 36 of the two-armed lever 35 has a cam end portion 40 with an intermediate portion slanting toward the plate 1 and an end portion parallel with said plate and against which the lower end of spindle 7 bears. As mentioned, the portion 40 has a section slanting toward the plate 1, that is toward said spindle, so that upon rotation of lever 35 in either direction, said spindle 7 is caused to raise or lower whether the mechanism is operated for a cartridge insertion or removal. A spring 41, threaded on said spindle 7, acts upon the latter to urge its end to constantly contact the slanted end 40 of lever 35.

The operation of the apparatus is as follows:

Supposing to be at the conditions shown in FIG. 2, which may both be the insertion time and the removal time for a cartridge 6, when this cartridge 6 is threaded within the frame 5 and inwardly pushed, its end edge will impinge against the end 29 of the two-armed lever 27, 28, causing the latter to rotate in the direction of the arrow shown in FIG. 4. This rotation of lever 27, 28 will release the spoke 22 of slider 19 from the corresponding seat on said arm 27 which, by rotating and taking the position as shown in FIG. 3, will load the spring 30. At the same time, the slider 19 is outwardly returned by the spring 24, which has been previously loaded, and the cam follower roller 17 slides on the slanted edge portion of the projection 16 on frame 5, enabling the latter and cartridge 6 therein to downward rotate to take the position parallel with plate 1, as shown in FIG. 1.

During this downward rotation of the guide frame 5 of cartridge 6, the spindle 8 will engage in the hole of the corresponding reel of said cartridge 6, and the spindle 7, upward urged by the shaped end 40 of the two-armed lever 35, the latter being caused to rotate through the action of spring 39, will insert in the drawing hole of the corresponding take-up reel for the magnetic tape of the cartridge. Thus, by the simultaneous downward movement of the guide frame 5 with the cartridge 6 and the upward movement of spindle 7, which is the spindle nearest the pivoting axis about which the cartridge carrying frame 5 rotates, it is possible to minimize the cartridge insertion inclination and hence the height dimension, as shown in FIG. 2.

Thus, should the spindle 7 not be downward moved, in order to release from the cartridge 6, the latter would have to be rotated upwards through a larger angle for enabling said spindle 7 to be also released. Thus, it has been shown that by the construction according to the invention, the height dimension for the entire apparatus can be minimized in addition to the other dimensions.

In order to remove the cartridge 6, movements are accomplished as opposite to those above described, and more particularly: loading the system by inwardly urging the slider 19 so that the latter will concurrently cause the spindle 7 to be lowered through the operation of the two-armed lever 35, the cartridge carrying frame 5 to be raised due to he cam follower roller 17 acting upon the profile of the cam projection 16 of said frame 5, and the spoke 22 of slider 19 to engage the corresponding seat 26 on the arm 27 of the two-armed lever 28 to lock the slider 19 and the entire mechanism as well at the position shown in FIG. 2.

It is to be understood that the foregoing as described and shown in the appended drawings was given by mere way of example and that other changes can be made without departing for this from the covering field of the invention.

What is claimed is:

1. A tape recording-reproducing apparatus of the automatically operated type of inserting a cartridge in a direction parallel with the recording-reproducing heads; the recording-reproducing apparatus comprising a cartridge carrying frame pivoted according to a transverse axis at its cartridge inlet end and movable between an upper release position and a lower position where the cartridge engages first and second magnetic tape take-up cartridge reel drawing spindles, the second spindle being more closely spaced from the pivoting axis of said frame, said second spindle being axially movable between a cartridge engaging position and a cartridge release position, manually operable cam means causing said second spindle to be raised and lowered so as to minimize the cartridge insertion angle and thus the height dimension of said recording-reproducing apparatus.

2. A recording-reproducing apparatus as claimed in claim 1, in which a manually operable slider is provided for lowering and raising said cartridge carrying frame, said slider carrying a roller which is effective on the slanted profile of a side projection of said cartridge carrying frame, the slider being provided with a spoke or dog capable of engaging and disengaging a first arm of a two-armed lever, the second arm of which is urged by the edge of an inserted cartridge to cause the rotation and release of said lever from the slider, springs acting upon said slider to bring it back to its starting position and on said lever to rotate it to its position where it engages said spoke or dog.

3. A recording-reproducing apparatus as claimed in claim 2, in which the means for causing the axial movement of the second spindle comprise a lever having a first arm engaged by said slider and a second arm with a slanted end, on which the lower end of said movable spindle rests, the slanted end of said lever facing said spindle for causing the axial movement of the latter between a cartridge engaging position and a cartridge disengaging position during the rotation of said lever in either direction.

4. A recording-reproducing apparatus as claimed in claim 3, in which said movable spindle operating lever engages a projection on said slider as the latter forwardly moves to cause the lever to rotate in a direction to lower the spindle to release it from the cartridge, a return spring acting on said lever to rotate it in an opposite direction as the slider moves in a direction opposite to the former direction.

* * * * *